Patented Apr. 26, 1938

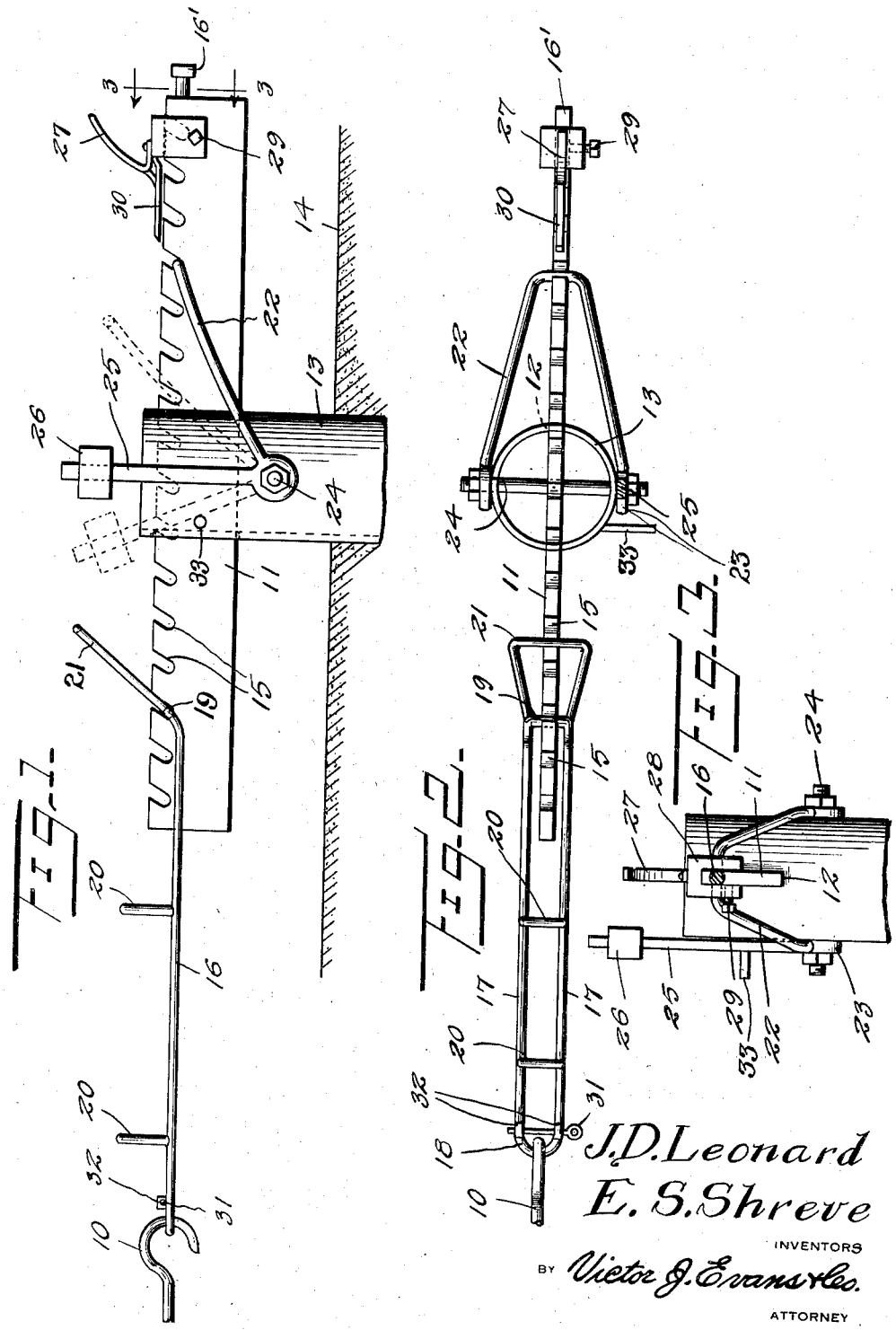

2,115,638

UNITED STATES PATENT OFFICE 2,115,638

ROD LINE COUPLING

Jesse D. Leonard and Edward S. Shreve,
Big Spring, Tex.

Application December 22, 1936, Serial No. 117,223

2 Claims. (Cl. 74—593)

This invention relates to rod line couplings and particularly to such a device adapted for connecting and disconnecting the pumping line of an oil well with a power source.

An object of the invention is to provide a coupling which may be hooked on and off the power source very easily and with safety to the operator.

A further object is to provide a coupling by means of which the length of the rod line may be varied without the use of the conventional turnbuckle.

A further object is to provide a coupling which will take up the slack in the rod line after a break therein has been repaired.

A further object is to provide a coupling which will automatically unhook from the power source and disconnect the rod line from the power in the event the rod line breaks.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of a rod line coupling constructed in accordance with the invention.

Figure 2 is a plan view of the parts shown in Figure 1.

Figure 3 is a cross sectional view taken on the line 3—3 of Figure 1.

Referring now to the drawing in which like characters of reference designate similar parts in the various views, 10 designates the power driven reciprocating hook which is connected to the power source so that it constantly reciprocates to reciprocate the rod line of an oil pump.

For connecting and disconnecting the rod line (not shown) with this hook, a coupling is provided comprising a bar 11 which is mounted to reciprocate in a slot 12 formed in a post 13, the latter being situated near the hook 10 and supporting the bar horizontally above the ground level 14. The bar is provided in its upper edge with a plurality of notches 15 which are sloped downwardly and rearwardly toward the hook 10. The bar is provided on one end with a stud 16' to which the rod line may be hooked. The length of the bar is determined by the length of the stroke of the rod line and is substantially the length of the stroke less the distance between two adjacent ones of the notches 15.

A coupling member, or clevis 16 connects the bar 11 to the hook 10. The clevis comprises parallel side members 17 connected at the ends by loops 18 and 19, there being inverted U-shaped handles 20 bridging the side members. An upwardly inclined handle 21 extends from the clevis at the loop 19. The loop 18 may be engaged upon the hook 10 while the loop 19 may be engaged in one of the notches 15 of the bar 11. The clevis 16 is light in weight and is easily handled by one man.

By engaging the loop 19 in a predetermined notch 15 of the bar 11 the effective length of the rod line may be varied.

A substantially U-shaped clevis 22, for hooking on and hooking off the rod line, is provided with eyes 23 which pivotally receive bolts 24 that are passed through the post 13. An arm 25 rises from one of the eyes and is equipped at the top with a weight 26. When the arm is in vertical position the bight of the clevis 22 will be engaged in one of the notches 15 of the bar 11. When the arm is tilted to off-center position as shown in dotted lines in Figure 1 the clevis 22 will be lifted from engagement with the bar and will be held in neutral position by the weight 26.

An arcuate trip finger 27 is adjustably mounted on the bar 11 by means of an inverted U-shaped bracket 28 best shown in Figure 3. The bracket straddles the bar 11 and is secured thereto by a set screw 29.

A strap 30 is secured to the bracket 28 and projects forwardly over several of the last notches in the bar 11, as shown in Figure 1, to prevent the rod line being pulled up too far.

To hook on a well, assuming that the clevis 22 is engaged in one of the notches 15, the clevis 16 is engaged with the power operated hook 10 and then is engaged in a desired notch 15 in the bar 11. When the bar 11 is pulled forward by the hook 10 and clevis 16, the clevis 22 will raise out of its notch by virtue of the inclination of the notch and will be struck by the trip finger 27 so that the weighted arm 25 will be moved to off-center position and hold the clevis 22 in neutral position and thus the bar 11 will be free to reciprocate in normal operation. The automatic trip finger 27 may be disposed in adjusted position on the bar 11 by means of the set screw 29 to vary the timing of the device as desired.

To hook off a well from the power it is simply necessary that the operator swing the arm 25 to on-center position so that the clevis 22 drops into a notch 15 in the bar 11 to hold the bar stationary. Now, when the hook 10 moves toward the bar 11 obviously the clevis 16 will drop out of the hook so that the bar 11 will be disconnected from the power.

Should the rod line break the bar 11 will obviously remain stationary and just as above described when the power hook 10 moves toward the rod the clevis 16 will drop out of the hook disconnecting the rod line from the power.

In order to take up slack in the rod line after a broken rod line has been repaired the clevis 16 is engaged in the hook 10 and is also engaged in whatever notch 15 in the bar that can be reached. A pin 31 is then engaged through eyes 32 in the side member 17 near the hook to prevent the clevis becoming unhooked from the hook 10. After the bar 11 is pulled to the left, see Figure 1, by the power hook 10, it will not return to the right because the clevis 22 will drop into some particular notch 15 in the bar 11 and hold the bar stationary. Then during movement of the hook 10 toward the bar 11 the clevis 16 will slide into another notch at the end of the stroke and this operation will be repeated until the proper amount of slack is pulled up.

To prevent the rod line from being pulled up too far, the strap 30 permits the clevis 22 to slide over several of the rear notches in the bar thus allowing the bar to return to a point where the clevis 16 falls into the proper notch to effect the desired length of stroke. Upon next succeeding stroke the automatic trip finger 27 operates the same as explained above to throw the clevis 22 to neutral position and hook on to the well. After the well is in operation again the pin 31 is removed so that the clevis 16 will disengage from the hook 10 in case of a break in the rod line.

A stop pin 33 is mounted on the post 13 to engage the arm 25 and releasably hold it in position to hold the clevis 22 disengaged from the bar 11.

From the above description it is thought that the construction and operation of the invention will be fully understood without further explanation.

What is claimed is:

1. A rod line coupling comprising a bar, a post supporting the bar to reciprocate horizontally above the ground line, the bar being provided with a plurality of notches which slope downwardly and rearwardly, a connection for a rod line on one end of the bar, a clevis engageable at one end in said notches and adapted to be engaged at the other end with a power operated hook, handles on the clevis, a clevis pivoted on the post, a counterweighted arm rising from the last named clevis, the last named clevis being adapted to be engaged in one of the notches of the bar when the arm is at one limit of pivotal movement and adapted to be disengaged from the bar when the arm is at the other limit of pivotal movement, and a trip finger on the bar adapted to strike the last named clevis and move the same to the last named limit of pivotal movement.

2. A rod line coupling comprising a post, a bar mounted to reciprocate horizontally on the post, said bar having notches in its upper edge, a clevis having one end adapted to engage one of said notches, a driven hook, said clevis being adapted to be detachably engaged with said hook, a pin removably mounted on the clevis for preventing the clevis from dropping off the hook, a clevis pivoted on said post and adapted to engage one of said notches, an upstanding arm carried by the clevis at the pivot thereof, a weight on said arm, said clevis being adapted to engage a notch in the bar when the arm is at one limit of pivotal movement and be disengaged from the notch when the arm is at its other limit of pivotal movement, a trip finger on the bar adapted to impinge against the clevis and move the arm to the last named limit of pivotal movement, and a plate on the bar housing several of the final notches of the bar to prevent the last named clevis from engaging in the last named notches.

JESSE D. LEONARD.
EDWARD S. SHREVE.